(12) United States Patent
Johnson

(10) Patent No.: US 10,226,139 B2
(45) Date of Patent: Mar. 12, 2019

(54) BASKET HANGER

(71) Applicant: Brad Johnson, Roseville, MN (US)

(72) Inventor: Brad Johnson, Roseville, MN (US)

( * ) Notice: Subject to any disclaimer, the term of this patent is extended or adjusted under 35 U.S.C. 154(b) by 159 days.

(21) Appl. No.: 15/234,414

(22) Filed: Aug. 11, 2016

(65) Prior Publication Data

US 2016/0345757 A1 Dec. 1, 2016

Related U.S. Application Data

(62) Division of application No. 14/167,606, filed on Jan. 29, 2014, now abandoned.

(60) Provisional application No. 61/758,076, filed on Jan. 29, 2013.

(51) Int. Cl.

| | |
|---|---|
| *B21D 53/00* | (2006.01) |
| *B21F 45/00* | (2006.01) |
| *B21F 45/16* | (2006.01) |
| *B23P 11/00* | (2006.01) |
| *A47G 7/04* | (2006.01) |

(52) U.S. Cl.
CPC ............. *A47G 7/047* (2013.01); *B21D 53/00* (2013.01); *B21F 45/00* (2013.01); *B21F 45/16* (2013.01); *B23P 11/005* (2013.01); *Y10T 29/49826* (2015.01); *Y10T 29/49908* (2015.01)

(58) Field of Classification Search
CPC ........ B21D 53/00; B23P 11/005; B21F 45/00; B21F 45/16; A47G 7/047; Y10T 29/49826; Y10T 29/49908
See application file for complete search history.

(56) References Cited

U.S. PATENT DOCUMENTS

| | | | |
|---|---|---|---|
| 486,185 A * | 11/1892 | Meneray | ................. E05C 19/06 292/80 |
| 858,840 A * | 7/1907 | Van Leeuwen, Jr. | ......................... A47G 7/047 248/318 |
| 926,274 A | 6/1909 | Meneray | |
| 1,534,508 A | 4/1925 | Earp-Thomas | |
| 2,140,996 A | 12/1938 | Heifetz | |
| 2,530,456 A | 11/1950 | Fracchia | |
| 2,960,798 A | 11/1960 | Lindstaedt et al. | |
| 4,019,279 A | 4/1977 | Moorman et al. | |
| 4,059,920 A * | 11/1977 | Worrell | .................... A01G 9/02 47/67 |
| 4,084,779 A | 4/1978 | Moineau | |
| 4,106,235 A | 8/1978 | Smith | |
| 4,147,320 A | 4/1979 | Biedebach | |
| 4,159,094 A | 6/1979 | Stekoll et al. | |
| 4,235,407 A | 11/1980 | Haas | |
| 4,385,742 A * | 5/1983 | Rocquin | ................ A47G 7/047 248/318 |
| 4,744,171 A | 5/1988 | Hilliard | |
| 4,875,653 A | 10/1989 | Connolly | |

(Continued)

*Primary Examiner* — Bayan Salone
(74) *Attorney, Agent, or Firm* — Thomas J. Oppold; Larkin Hoffman Daly & Lindgren, Ltd.

(57) ABSTRACT

A basket hanger a method of forming a hook for the basket hanger and a method of attaching the basket hanger to a basket. The basket hanger having a hook with a plurality of steel wires strands attached at a proximal end to the hook, the steel wire strands having a substantially straight downwardly extending portion terminated at a distal end in a clip with an upwardly extending leg, the upwardly extending leg canted to one side and having a dogleg. The steel wire strands may be spring steel.

3 Claims, 4 Drawing Sheets

(56) References Cited

U.S. PATENT DOCUMENTS

| | | |
|---|---|---|
| 4,877,210 A | 10/1989 | Missalla |
| 4,934,634 A | 6/1990 | Breeden, Jr. et al. |
| 4,939,865 A | 7/1990 | Whitcomb et al. |
| 4,955,156 A | 9/1990 | Williams |
| 5,371,967 A | 12/1994 | Albrecht |
| 5,383,302 A | 1/1995 | Hill |
| 5,477,639 A | 12/1995 | Smith |
| 5,937,577 A | 8/1999 | Butler et al. |
| 6,367,194 B1 | 4/2002 | Measday et al. |
| 6,481,593 B2 | 11/2002 | Banhagel |
| 6,637,155 B1 | 10/2003 | Butler et al. |
| 7,013,601 B2 | 3/2006 | Liffers et al. |
| 2003/0034266 A1 | 2/2003 | Banhagel |
| 2005/0166454 A1 | 8/2005 | Banhagel |
| 2007/0170334 A1* | 7/2007 | Ambrose ............... A47G 7/047 248/317 |
| 2007/0200043 A1* | 8/2007 | Just ....................... A47G 7/047 248/341 |
| 2008/0028678 A1 | 2/2008 | Banhagel |
| 2009/0173002 A1 | 7/2009 | Plihal |

\* cited by examiner

BASKET HANGER

CROSS-REFERENCE TO RELATED APPLICATIONS

This application is a divisional of U.S. application Ser. No. 14/167,606, filed Jan. 29, 2014, which claims the benefit to U.S. Provisional Application No. 61/758,076, filed Jan. 29, 2013.

BACKGROUND

Hangers for plant baskets are well known. A conventional basket hanger includes an upper hook, from which a plurality of strands (typically three or four) extend downwardly. The distal ends of the strands are configured to attach to the flange of a plastic basket. The strands of conventional hangers are comprised of either mild steel wire which are welded or otherwise secured to the upper hook or, alternatively, the strands and hook are molded entirely from plastic.

Steel wire hangers offer the advantage of strength and are typically considered more aesthetically appealing than plastic hangers, but if the mild steel wire strands become bent during shipping or use, the bent wire strands will detract from the smooth, clean lines typically desired for hanging baskets. Accordingly, finished hanging basket products with mild steel wire hangers are more costly to package and ship because the mild steel wire hangers cannot be bent over for shipping in a box or shipping cage without detracting from their appearance, thereby requiring longer packages or shipping cages, even if the wire hangers are detached from the hanging baskets. Additionally, to attach a mild steel wire hanger to a hanging basket, a worker or purchaser will typically have to insert the end of the mild steel wire strands through holes in the basket flange and then bend and either twist or squeeze the end of the wire by hand to secure it to the basket. Depending on the diameter of the mild steel wire strand, in order to properly secure the hanger to the basket, a pliers or tool may be required. With or without tools, but especially without tools, if a worker's job duty is to attach conventional mild steel wire strand hangers to hanging baskets throughout the day, repeating this task several times a day can cause considerable pain and injury to the hands of a worker. Additionally, if a conventional mild steel wire strand hanger is not properly secured, the bend created at the bottom of the mild steel wire strand will open up and the hanger will detach from the basket even under normal conditions, let alone under high wind conditions when the basket is twisting and swaying.

Plastic hangers offer the advantage of allowing the hangers to be coiled or bent to fit into shorter packages when shipping the hanging basket, but plastic stranded hangers are necessarily larger in diameter than steel wire strand hangers to achieve the same tensile strength and therefore plastic strands are typically considered less aesthetically appealing. Furthermore, plastic strands and conventional mild steel wire strands are more susceptible to breaking in high wind conditions which can cause a hanging plant to twist and swing.

Accordingly, there is a need for a basket hanger which offers the advantages of a hanger with steel wire strands but which provides the advantages of allowing the hanger to be coiled or bent like a plastic hanger, but which will hold up to twisting and swaying in high wind conditions common in many areas. There is also a need for an improved manner of attaching the hanger to the basket which is more quickly and efficiently attached and does not require the use of a pliers or other tools.

DESCRIPTION

Figure 1:
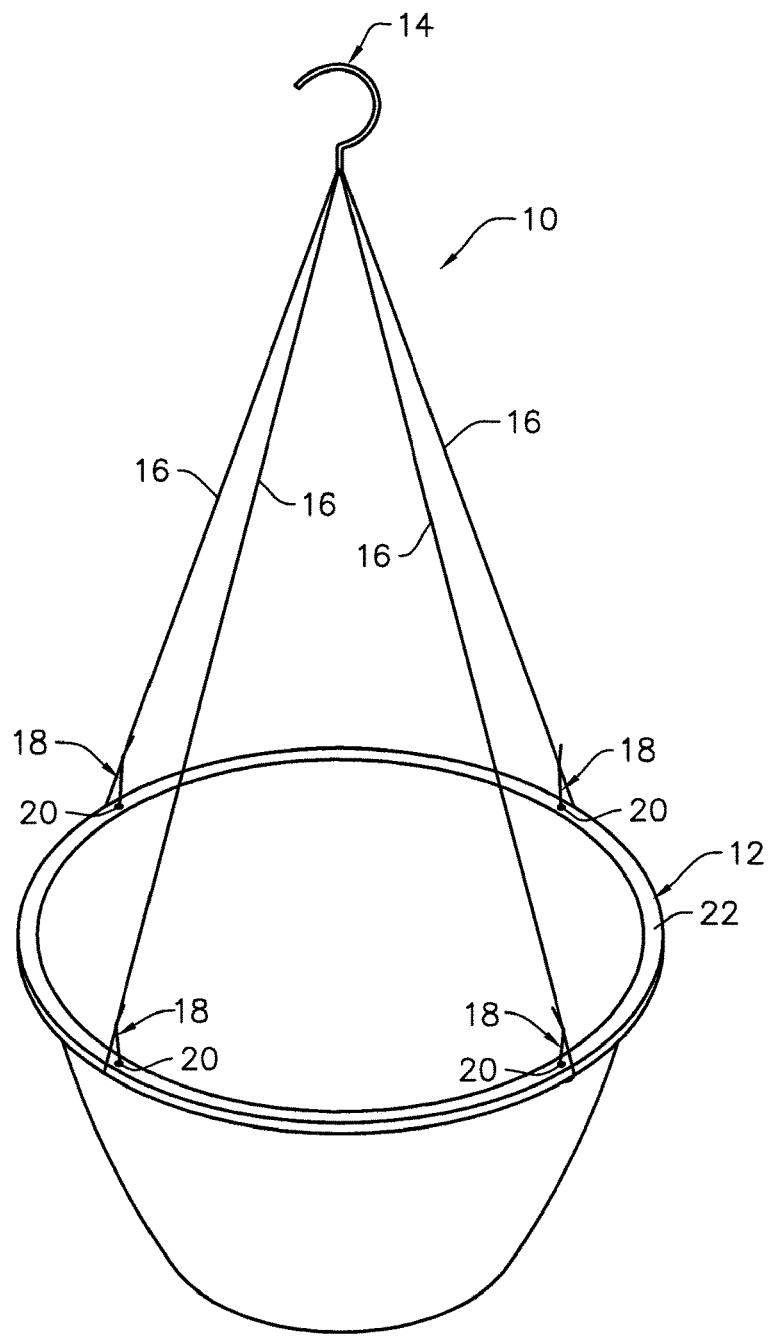
FIG. 1 is a perspective view of an embodiment of hanger attached to a basket.
Figure 2:
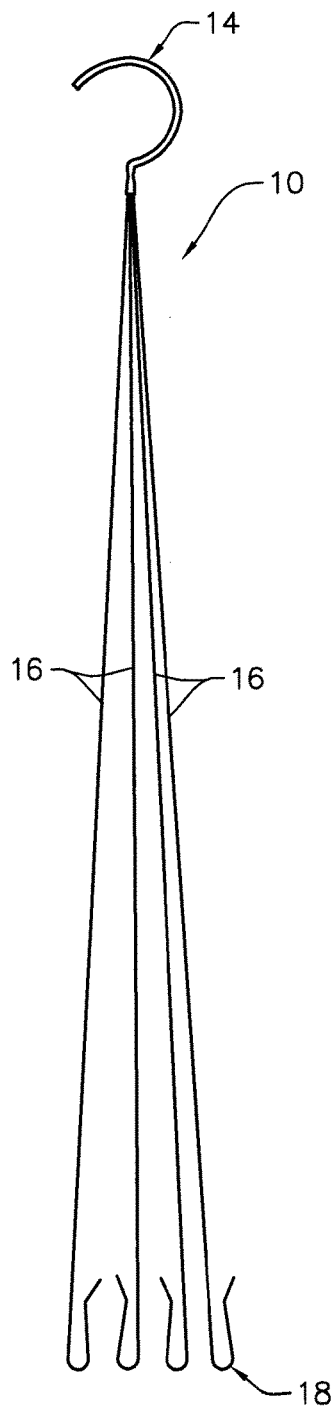
FIG. 2 is an embodiment of the hanger of FIG. 1 detached from the basket.

Referring to the drawings wherein like reference numerals designate the same or corresponding parts throughout the several views, FIG. 1 is a perspective view of the hanger 10 attached to a basket 12, such as those typically sold by nurseries and flower shops for hanging plants. It should be appreciated that the basket 12 may be any size or configuration. The hanger 10 has an upper hook 14 from with multiple wire strands 16 extend downwardly. Each wire strand 16 has a clip 18 formed at its distal end (best illustrated in FIGS. 2-4). The clips 18 extend through holes 20 in the peripheral flange 22 of the basket 12 (best illustrated in FIGS. 5-6) for securing the hanger 10 to the basket 12. Although the hanger 10 is shown in FIG. 1 as having four strands 16, it should be appreciated that the hanger 10 may be comprised of three or more strands as desired.

The wire strands 16 are preferably comprised of spring steel. The spring steel wires may be finished by galvanizing, powder coating, painting, applying a polymer coating or any other desired finish. Use of spring steel allows the strands 16 to be coiled, twisted and/or significantly bent but due to the high yield strength of spring steel, the strands will return to their original straight shape without any deformation (provided the strands are not bent to the point of plastic deformation). Thus, the use of spring steel allows the strands 16 to be coiled or bent for placing into the shorter shipping boxes used for shipping plastic hanger baskets, but unlike mild steel or plastic hangers, the spring steel strands will "spring" back to their original straight shape without leaving unsightly bends or kinks in the strands that are common with conventional mild steel wire hangers and even with plastic hangers if the weight of the hanging basket and plant is not sufficient to remove the bends and kinks in the plastic strands. Additionally, the high yield strength of spring steel allows the strands to have a thinner diameter than is possible with plastic strand hangers, so the strands are less visible and do not detract from the appearance of hanging plants. The high yield strength spring steel also allows the hanger strands to be longer than is economically possible with plastic strand hangers, thereby offering a more elegant look for hanging plants.

Furthermore, unlike plastic strand hangers and conventional mild steel wire strand hangers which often break due to the twisting and swaying of the plant hangers in windy conditions, spring steel strand hangers are much less susceptible to breaking due to the high yield strength. Also, because of the higher yield strength of spring steel compared to mild steel, smaller wire diameters while still providing equal or greater weight bearing capacity than larger diameter conventional mild steel wire strands, thereby permitting the spring steel wire strands to be more easily attached to the baskets as discussed in greater detail below.

In addition, unlike plastic hangers which can deteriorate and become brittle after a single season and unlike conventional mild steel wire hangers which inevitably become bent after a single season or during storage over the winter months, spring steel hangers can be reused year after year without deterioration, and without unsightly bends and kinks.

Figure 3:
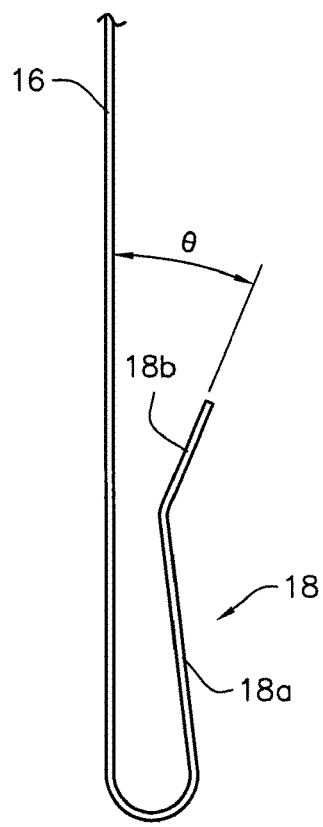
FIG. 3 is an enlarged side elevation view of the lower end of the hanger strand showing an embodiment of the clip.
Figure 4:
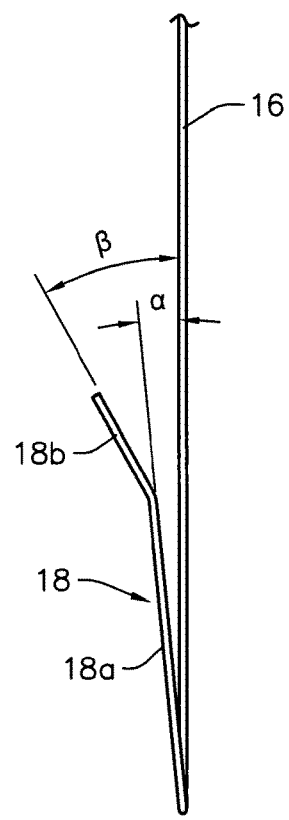
FIG. 4 is a front elevation view of the clip of FIG. 3.

FIGS. 3-4 illustrate one embodiment of the clip 18. It should be appreciated that if spring steel is used for the strands 16, the bends in the spring steel to form the configuration of the clip 18 as illustrated, requires the spring steel to be bent to the point of plastic deformation in order for the spring steel to retain the clip configuration. The clip 18 is formed by bending the distal end of the substantially straight downwardly extending strand 16 approximately 180 degrees to form an upwardly extending leg 18a. The end of the upwardly extending leg 18a is then bent outwardly at angle θ from the substantially straight portion of the strand 16 to form a short dogleg 18b. Angle θ could be any angle between about 5 degrees to 90 degrees. Referring to FIG. 4, the upwardly extending leg is then canted to one side of the substantially straight portion of the strand 16 at an angle α and the dogleg 18b is bent further to the canted side forming an offset at an angle β from the substantially straight portion of the strand 16. It should be appreciated that angle α will be less than angle β. Angle α will typically be in a range from about 1 degree to about 90 degrees. Moreover, angle β is about 5 degrees to 90 degrees. The angles and doglegs in the upwardly extending leg of the clip 18 allows the clip to have a very small profile lending itself to be less noticeable when the strands 16 are attached to the basket as described below and providing a more aesthetically pleasing appearance.

Figure 5:
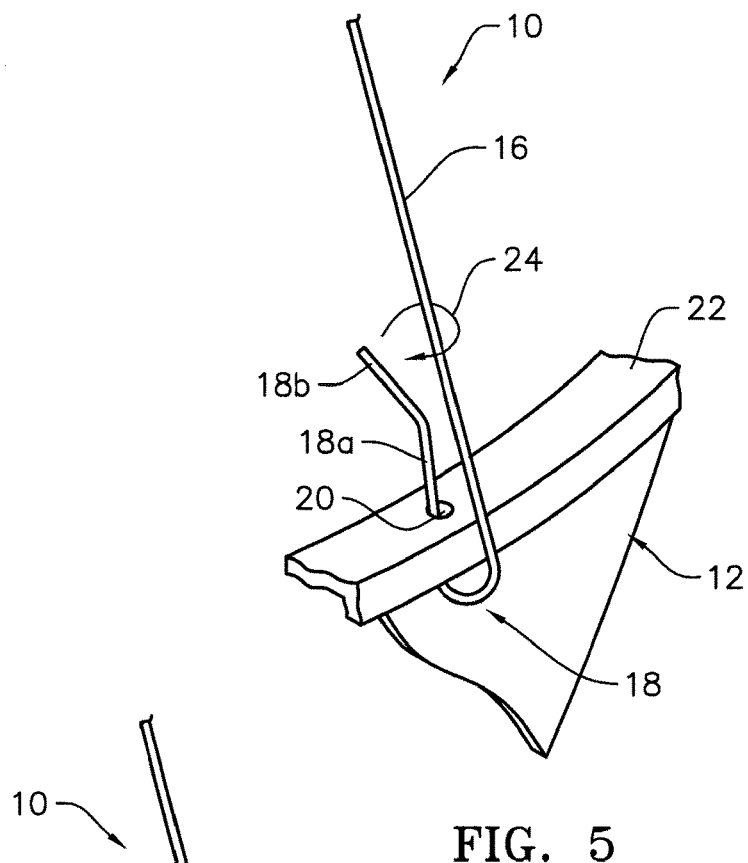
FIGS. 5-6 are enlarged partial perspective views of the basket of FIG. 1 illustrating the steps of attaching the strands to the basket using the clips.
Figure 6:
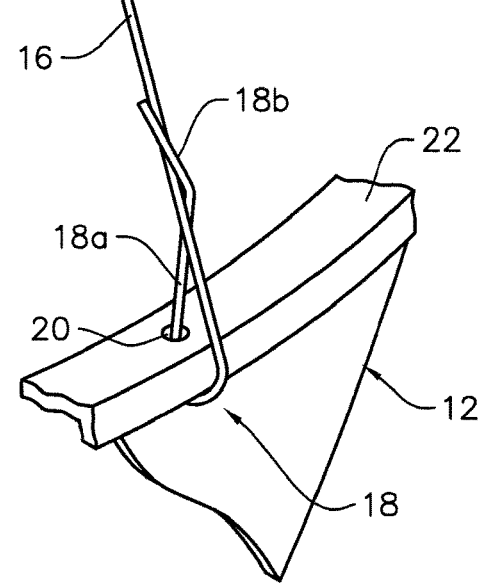

Referring to FIGS. 5-6, the basket 12 is attached to the hanger 10 by inserting the upwardly extending leg 18a through a hole 20 in the flange 22 of the basket 12. The outwardly angled and offset dogleg 18b is then pulled outwardly toward and around the back side of the strand 16 as illustrated by arrow 24 in FIG. 5 using one's fingers and thumb. Upon release, the outwardly angled and offset dogleg 18b snaps forward and clips over the strand 16 as illustrated in FIG. 6 thereby securely attaching the strand 16 to the basket 12. It should be appreciated that it is desirable to orient the clip 18 so the upwardly extending leg 18a and dogleg 18b is facing the inside of the basket 12 when inserting the upwardly extending leg 18a through the hole 20 (as shown in FIG. 5) so that when the dogleg 18b wraps over the strand 16 (as shown in FIG. 6), the end of the dogleg 18b points toward the inside of the basket 12. If the clip 18 is oriented in the opposite direction when attaching to the basket, the end of the dogleg 18b will project outwardly, which could catch or scratch on persons walking by the hanging plant.

By way of example, for a twenty-six inch long, four strand hanger 10, made from spring steel wire having a wire diameters ranging between about 0.04 inches and 0.07 inches (which may vary depending on the size of the basket to be supported), one suitable configuration for the clip 18 has been found to utilize a 3/16 inch radius for the 180 degree bend, and a length of 1-¼ inches for the upwardly extending leg 18a, with a dogleg 18b of ⅝ inches bent outwardly at an angle θ of approximately forty degrees from the downwardly extending straight portion of the strand 16, and with a canted angle α of approximately ten degrees and an offset angle β for the dogleg 18b of approximately forty degrees. Such a clip has been found to allow workers to more quickly and easily attach the hangers to the baskets using only their fingers and thumbs without causing pain or injury to their hands despite performing the task all day. The clip configuration combined with the qualities of spring steel also eliminates the need for using a pliers or other tool which is typically necessary in order to bend and twist the wire of a conventional mild steel wire hanger strand, thereby amounting up to fifty percent (50%) labor savings.

It should appreciated that other dimensions and angles may be equally or better suited for the clip 18 depending on the diameter of the wire, the length of the hanger 10, the diameter of the basket 12, the width of the basket flange 22 and/or placement of the hole 20 in the flange 22, the number of strands 16 comprising the hanger 10, the weight of the plant or items intended to be supported by the hanger 10, wind or other environmental conditions where the hanger is intended to be used, and other factors. Accordingly, the scope of the invention should not be construed as being limited to the specific dimensions and angles of the clip 18 identified above.

Figures 7, 8:
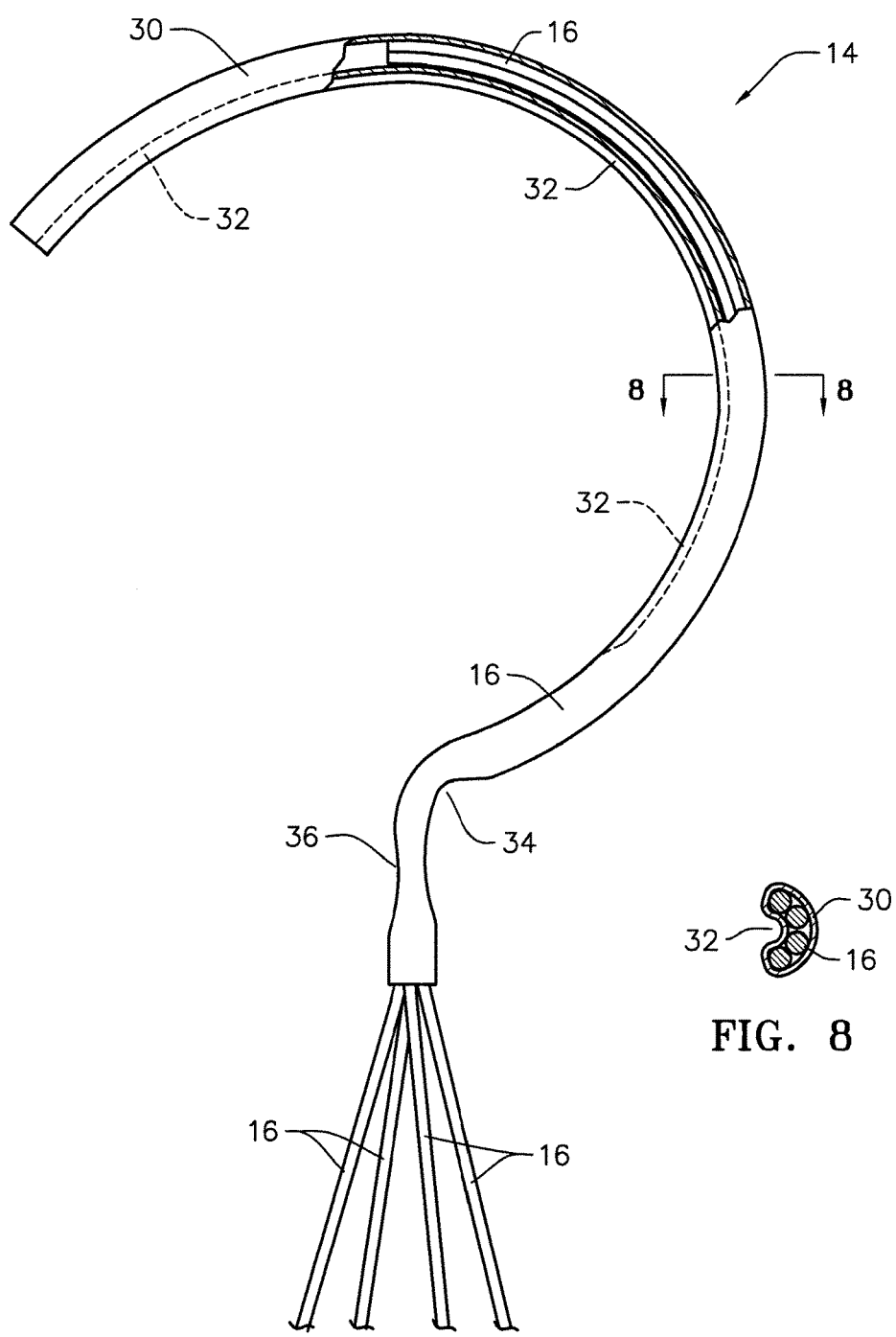
FIG. 7 is an enlarged partial cross-sectional view of the hanger hook.
FIG. 8 is a cross-sectional view of the hanger hook as viewed along lines 8-8 of FIG. 7.

Referring to FIGS. 7 and 8, one embodiment of the hook 14 includes a tubular member 30, which may be aluminum, steel or other suitable material depending on the strength needed to support the hanging basket 12. The strands 16 are inserted approximately ¾ of the way into the tubular member (see partial cross-section of FIG. 7 showing the ends of the strands 16 within the tubular member 30). The hook 14 includes a longitudinal crimp 32 formed in the tubular member 30 along the inner periphery of the hook as best viewed in FIG. 8, which is a cross-sectional view of the hook 14 as viewed along lines 8-8 of FIG. 7. An upper transverse crimp as indicated by reference numeral 34 and a lower transverse crimp as indicated by reference numeral 36 also secures the strands 16 within the tubular member 30. The bending of the circular hook shape and formation of the longitudinal crimp 32 and the offset transverse crimps 34, 36 are preferably made simultaneously using a press. The foregoing hook configuration is particularly well suited for securing the tubular member 30 to strands 16 made of spring steel because the tubular member 30 is securely fastened to the strands 16 in both a longitudinal direction and transverse directions thereby reducing the amount of transverse crimping needed toward the bottom of the hook which could cause the tube to split and/or weaken the strands.

The foregoing description is presented to enable one of ordinary skill in the art to make and use the invention and is provided in the context of a patent application and its requirements. Various modifications to the preferred embodiment of the apparatus, and the general principles and features of the apparatus and methods described herein will be readily apparent to those of skill in the art. Thus, the invention is not to be limited to the embodiments of the apparatus and methods described above and illustrated in the drawing figures, but is to be accorded the widest scope consistent with the spirit and scope of the appended claims.

The invention claimed is:

1. A method of securing a hanger to a basket, the hanger comprising a hook and a plurality of spring steel wire strands attached at a proximal end to the hook, each of the plurality of spring steel wire strands having a substantially straight downwardly extending portion terminating at a distal end in a clip, the clip comprising an approximate 180 degree upward bend forming an upwardly extending leg, an end portion of the upwardly extending leg bent outwardly at angle $\theta$ from the substantially straight downwardly extending portion forming a short dogleg, the upwardly extending leg canted to one side at an angle $\alpha$ to the substantially straight downwardly extending portion and the dogleg offset further to the canted side at an angle $\beta$ from the substantially straight downwardly extending portion, wherein the angle $\theta$ is about 5 degrees to 90 degrees and wherein the angle $\alpha$ is about 1 degree to about 90 degrees and wherein the angle $\beta$ is about 5 degrees to 90 degrees; the method comprising:
   (a) orienting the clip of one of the plurality of spring steel wire strands toward a center of the basket and inserting the upwardly extending leg of the clip through a hole in a flange of the basket;
   (b) pulling the upwardly extending leg extending through the hole in the flange of the basket toward a side away from the canted side and away from the center of the basket until the dogleg is on a back side of the downwardly extending substantially straight portion of the one spring steel wire strand;
   (c) releasing the upwardly extending leg portion such that the dogleg partially wraps around said downwardly extending substantially straight portion of the one spring steel wire strand;
   d) repeating steps (a) through (c) for all of the plurality of spring steel wire strands.

2. The method of claim 1 wherein the angle $\theta$ is approximate forty degrees, wherein the angle $\alpha$ is approximately ten degrees, wherein the angle $\beta$ is approximately forty degrees and wherein the 180 degree bend has a radius of approximately 3/16 inches.

3. The method of claim 1 wherein the hook comprises a tubular member with a longitudinal axis, the tubular member having a length, a first end and a second end, the proximal ends of the plurality of spring steel wire strands extending into the tubular member a distance of approximately 3/4 of the length, the tubular member having a longitudinal crimp between the first and second ends, the longitudinal crimp securing the proximal end of the plurality of spring steel wire strands within a portion of the length of the tubular member, the tubular member having a transverse crimp proximate the second end, the transverse crimp further securing the proximal ends of the plurality of spring steel wire strands within a portion of the length of the tubular member, the tubular member being bent between said first and second ends into a hook shape.

* * * * *